(12) United States Patent
Lin

(10) Patent No.: US 7,606,032 B2
(45) Date of Patent: Oct. 20, 2009

(54) STRUCTURAL SCREW SECURE DEVICE FOR A RADIATOR ASSEMBLY

(75) Inventor: Sheng-Huang Lin, Kaohsiung (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 360 days.

(21) Appl. No.: 11/742,593

(22) Filed: May 1, 2007

(65) Prior Publication Data

US 2008/0273942 A1 Nov. 6, 2008

(51) Int. Cl.
*H05K 7/20* (2006.01)
*F28D 15/00* (2006.01)

(52) U.S. Cl. .................. 361/709; 361/704; 361/710

(58) Field of Classification Search .............. 361/707, 361/709, 704, 710
See application file for complete search history.

(56) References Cited

U.S. PATENT DOCUMENTS

| | | | | |
|---|---|---|---|---|
| 5,648,890 A * | 7/1997 | Loo et al. | | 361/704 |
| 6,480,387 B1 * | 11/2002 | Lee et al. | | 361/704 |
| 6,611,431 B1 * | 8/2003 | Lee et al. | | 361/719 |
| 6,812,485 B2 * | 11/2004 | Shah et al. | | 257/48 |
| 6,826,054 B2 * | 11/2004 | Liu | | 361/719 |
| 6,930,884 B2 * | 8/2005 | Cromwell et al. | | 361/710 |
| 6,950,306 B2 * | 9/2005 | Huang et al. | | 361/697 |
| 6,976,525 B2 * | 12/2005 | Lin | | 165/80.3 |
| 7,019,979 B2 * | 3/2006 | Wang et al. | | 361/719 |
| 7,133,288 B2 * | 11/2006 | DelPrete et al. | | 361/719 |
| 7,193,851 B2 * | 3/2007 | Yatskov | | 361/710 |
| 7,209,354 B2 * | 4/2007 | Wu et al. | | 361/697 |
| 7,283,364 B2 * | 10/2007 | Refai-Ahmed et al. | | 361/719 |
| D561,121 S * | 2/2008 | Mochizuki et al. | | D13/179 |
| 7,430,122 B2 * | 9/2008 | Li | | 361/719 |
| 2003/0107874 A1 * | 6/2003 | Feigenbaum et al. | | 361/704 |
| 2004/0047130 A1 * | 3/2004 | Liu | | 361/704 |
| 2004/0212963 A1 * | 10/2004 | Unrein | | 361/704 |
| 2006/0007659 A1 * | 1/2006 | Lee et al. | | 361/704 |
| 2006/0054369 A1 * | 3/2006 | Pan | | 180/68.4 |
| 2006/0245165 A1 * | 11/2006 | Lin | | 361/704 |
| 2007/0091576 A1 * | 4/2007 | Wung et al. | | 361/719 |
| 2007/0217159 A1 * | 9/2007 | Long et al. | | 361/704 |
| 2007/0242439 A1 * | 10/2007 | Lu et al. | | 361/719 |
| 2008/0030952 A1 * | 2/2008 | Chen et al. | | 361/697 |
| 2008/0062653 A1 * | 3/2008 | Li | | 361/719 |

FOREIGN PATENT DOCUMENTS

| | | | |
|---|---|---|---|
| DE | 102005002205 A1 * | 7/2006 | |
| JP | 2006032816 A * | 2/2006 | |
| JP | 2006179584 A * | 7/2006 | |
| JP | 2006237290 A * | 9/2006 | |

* cited by examiner

*Primary Examiner*—Anatoly Vortman

(57) ABSTRACT

A structural screw device for a radiator assembly includes a frame and four screw members. The frame with four corners provides at least a leg post with an axial through hole respectively. The respective screw member is inserted into the leg post and the main body of the screw member is surrounded with an elastic member. The axial through hole of the leg post provides a step at intersection of the first and second hole sections. The free end of the leg post has split paw portions and each of the paw portions has an inner projection such that the neck section is caught with the projection while the screw member is inserted into the through hole in a way of the engaging section extending to the paw portions and the elastic member being biased against the step. Therefore, the projection is capable of being propped up to be away from the neck section and restoring to hold the neck section.

18 Claims, 10 Drawing Sheets

STRUCTURAL SCREW SECURE DEVICE FOR A RADIATOR ASSEMBLY

BACKGROUND OF THE INVENTION

1. Field of the Invention

The present invention is related to a structural screw secure device for a radiator assembly and particularly to a frame structure capable of catching and releasing screws directly.

2. Brief Description of the Related Art

Referring to FIGS. 1, 2 and 3, the conventional device includes a frame 1 and at least a screw member 13. At least a leg post 11 extends from the frame 1 and a through hole 12 penetrates the leg post 11. A projection 111 is provided at the inner side of the free end of the leg post 11 and at least a support piece 112 is provided at outer side of the free end of the leg post 11. A secure ring 14 with an engaging hole 141 is inserted into the free end of the leg post 11 to be disposed at a side of the secure ring 14.

The screw member 13 provides a head section 131 at an end thereof with a diameter greater than the main body of the screw member 13 and a screw section 132 at another end thereof. Further, a neck section 33 is provided between the screw section 132 and the main body of the screw member 13 and a spring 15 is surrounded by the main body of the screw member 13.

When the screw member 13 is inserted into the leg post 11, the screw section passes through the through hole 12 and the neck section 133 fits with the engaging hole 141 of the secure ring 14. Further, both ends of the spring 15 are biased with the head section 131 and the projection 111. In this way, the secure ring 14 is capable of preventing the screw member 13 from escaping in the reversed direction.

The deficiency of the preceding conventional device is in that the secure ring 14, which is an external part, is employed to hold the neck section 133 of the screw member 13. If the screw member 13 is joined to the leg post 11 directly instead of using the secure ring 14, the material cost can be saved significantly. Further, once the screw member 13 is detached from the leg post 11, the secure ring 14 with the leg post 11 has to be propped up destructively and incapable of being reusable.

SUMMARY OF THE INVENTION

Accordingly, in order to overcome the preceding disadvantages, an object of the present invention is to provide a structural screw secure device for a radiator assembly, which is assembled or disassembled easily for lowering material cost and being capable of being reusable.

Another object of the present invention is to provide a structural screw secure device for a radiator assembly, which is capable of locating and aligning the radiator speedily.

In order to achieve the preceding objects, a structural screw secure device for a radiator assembly according to the present invention includes a frame and four screw members. The frame with four corners provides at least a leg post with an axial through hole respectively. The respective screw member is inserted into the leg post and the main body of the screw member is surrounded with an elastic member. The axial through hole of the leg post provides a step at an intersection of the first and the second hole sections. The free end of the leg post has split paw portions and each of the paw portions has an inner projection such that the neck section is caught with the projection while the screw member is inserted into the through hole in a way of the engaging section extending to the paw portions and the elastic member being biased against the step. Therefore, the projection is capable of being propped up to be away from the neck section and restoring to hold the neck section.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
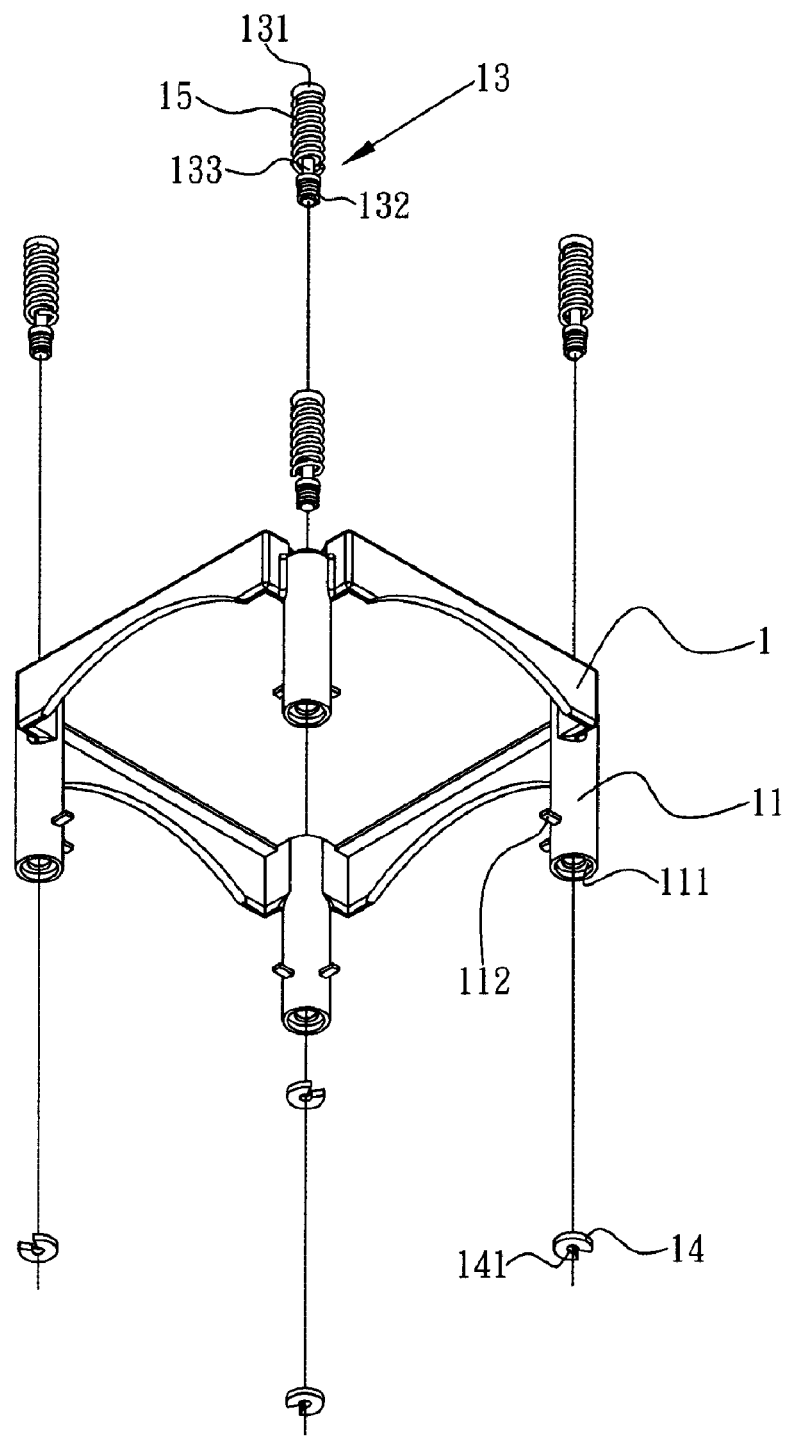
FIG. 1 is a disassembled perspective view of the conventional structural screw device.
Figure 2:
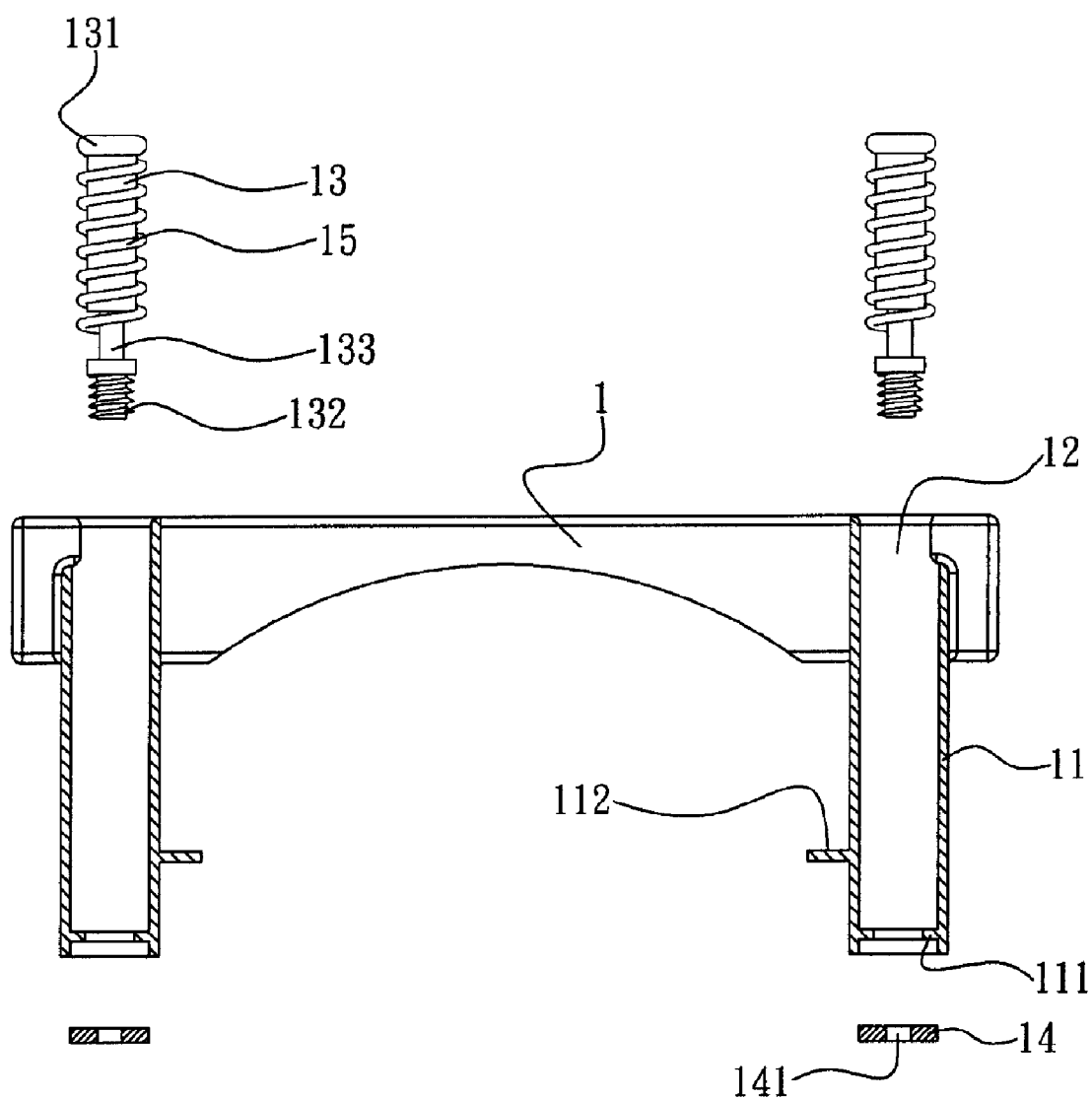
FIG. 2 is a disassembled sectional view of the conventional structural screw device shown in FIG. 1.
Figure 3:
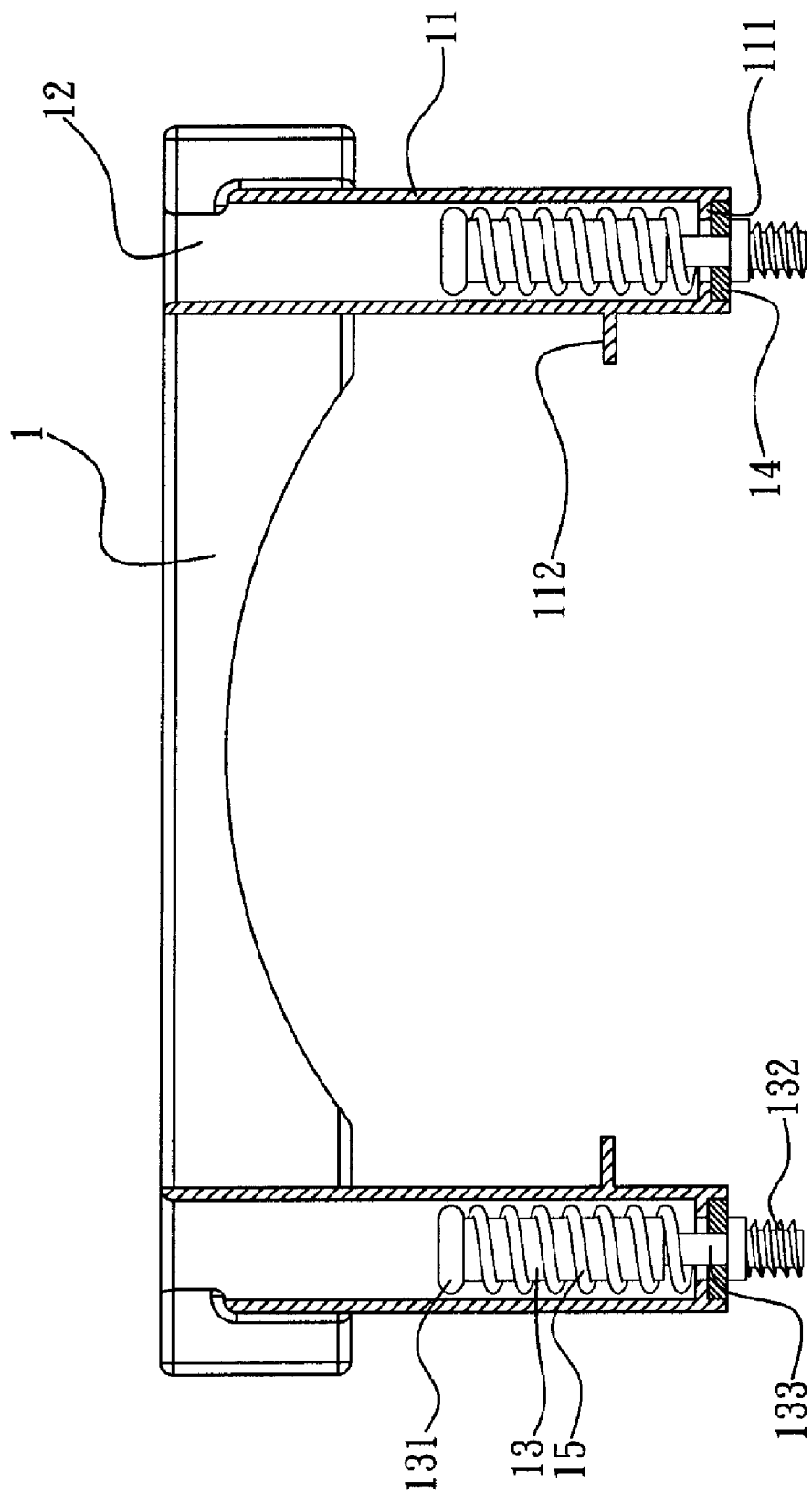
FIG. 3 is an assembled sectional view of FIG. 2.
Figure 4:
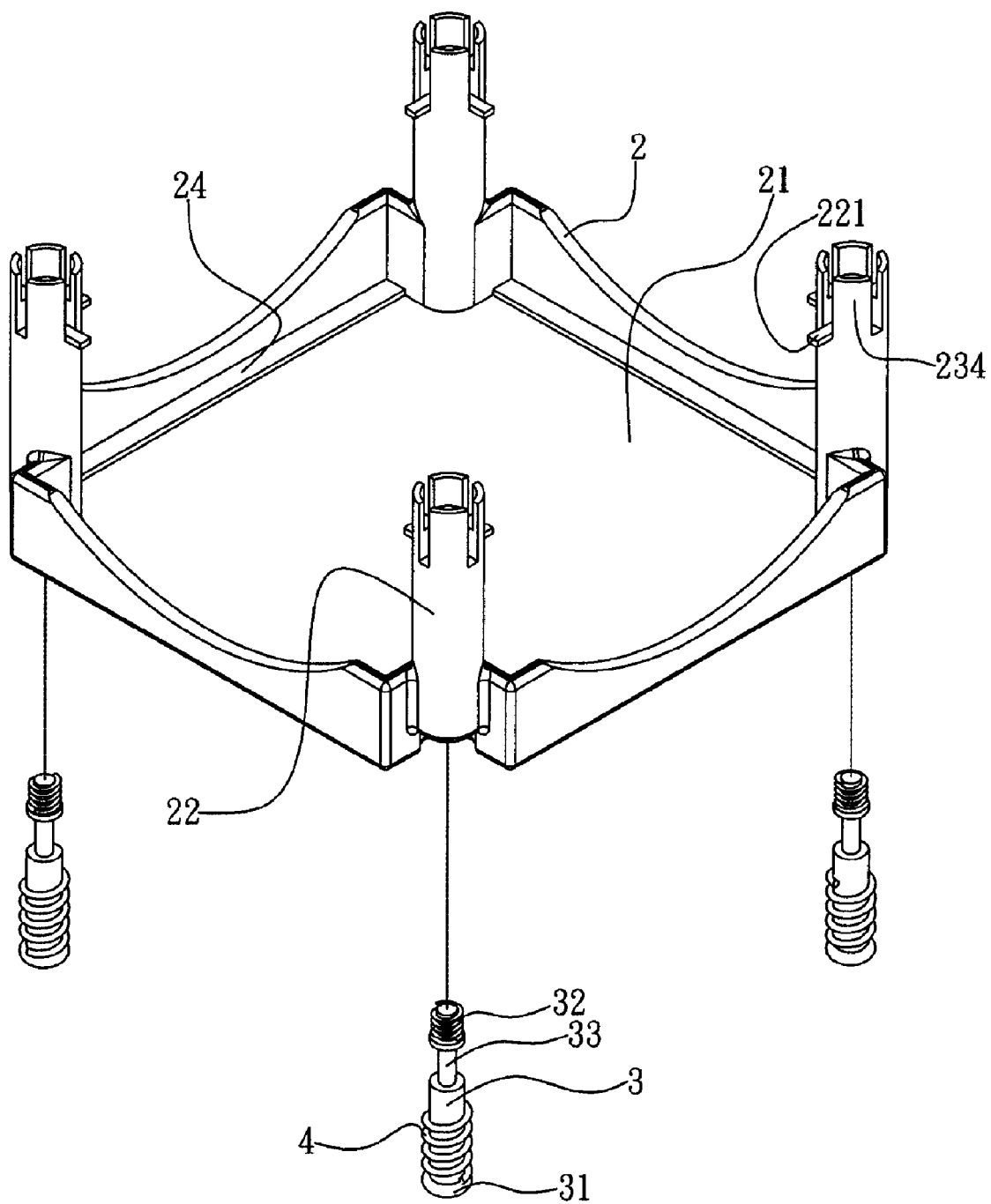
FIG. 4 is a disassembled perspective view of a preferred embodiment according to the present invention.
Figure 5:
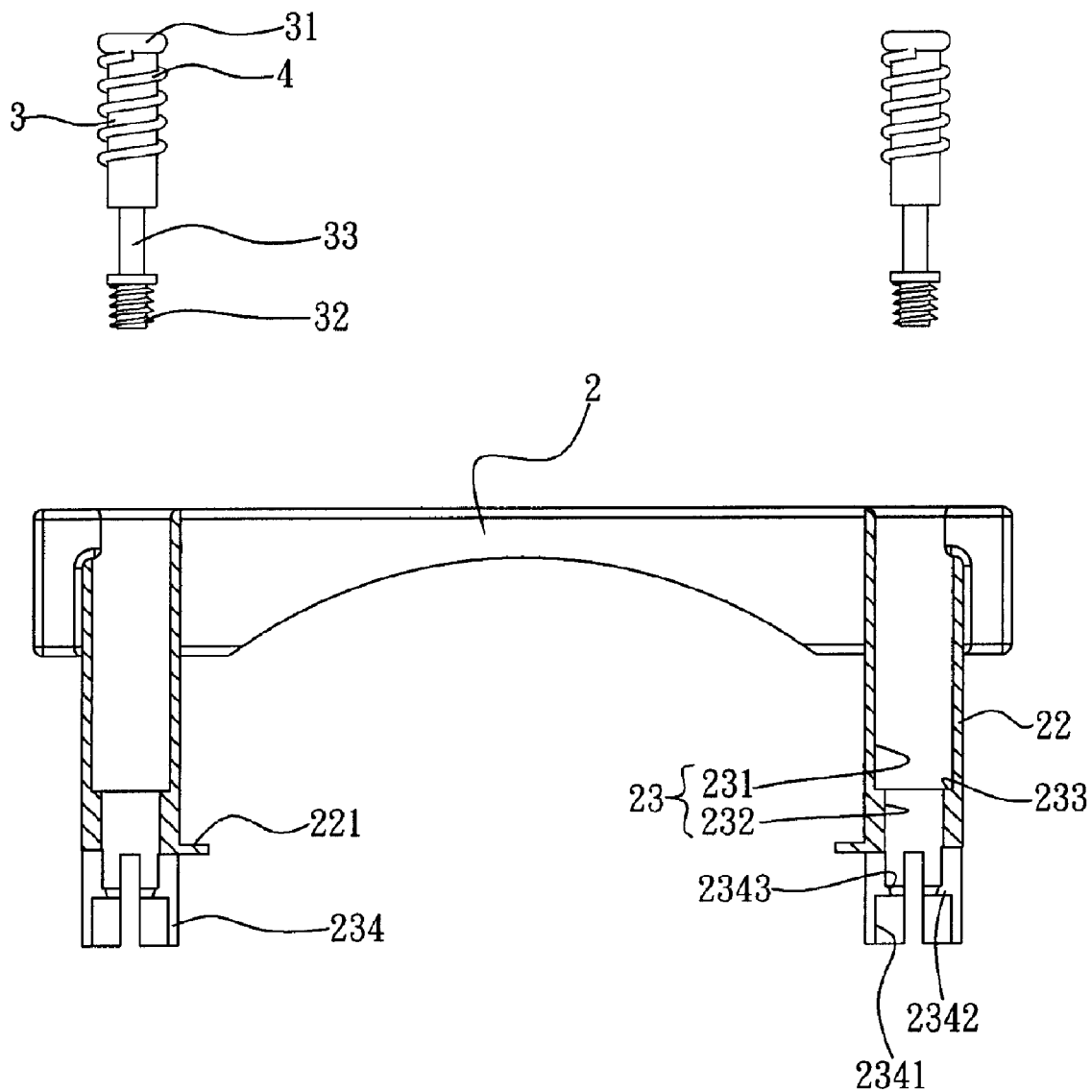
FIG. 5 is a disassembled sectional view of the preferred embodiment shown in FIG. 4.
Figure 6:
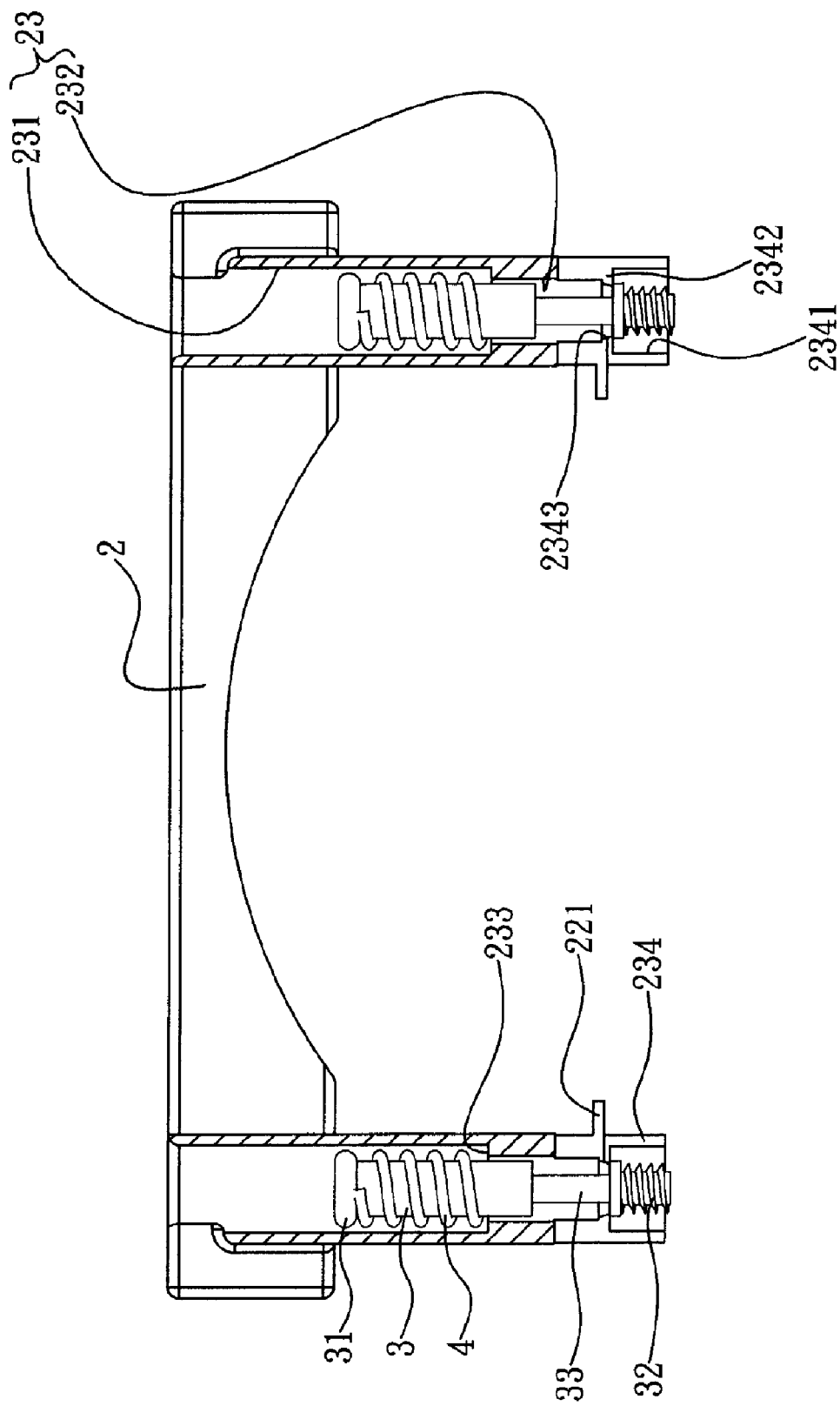
FIG. 6 is an assembled sectional view of FIG. 5.

Referring to FIGS. 4, 5 and 6, the preferred embodiment of a structural screw device for a radiator assembly according to the present invention includes a frame 2 and at least a screw member 3. The frame 2 with a hollow space 21 has an upper plate 24 surrounding the hollow space 21 and four corners of the frame 2 integrally extend a vertical leg post 22 respectively. The leg post 22 has an inner step hole 23 with a first hole section 231 and a second hole section 232. The first hole section 231 has an inner diameter greater than that of the second hole section 232 such that a step 233 is formed between the first and second hole sections 231, 232. A plurality of paw tabs 234 extend downward from the second hole section 232 to form a third hole section 2341. Each of the paw tabs provides a projection 2342 with a conical guide part 2343 at the inner side thereof.

The leg post 22 provides a support piece 221 at the outer side next to the upper end of the paw tabs 234 and the support piece 221 is disposed being opposite to the upper plate 24.

The screw member 3 provides a head part 31 at an end thereof and is sleeved with an elastic member 4 at the main body thereof. Another end of the screw member 3 is an engaging section 32 and a neck section 33 is disposed between the engaging section 32 and the main body of the screw 3 corresponding to the projection 2342. The engaging section 32 provides external screw threads and heads toward the step hole 23 while the screw member 3 is inserted into the step hole 23.

Further, the neck section 33 has an axial length being equal to or greater than the engaging section 32 for the neck section 33 being capable of moving axially.

Figure 7:
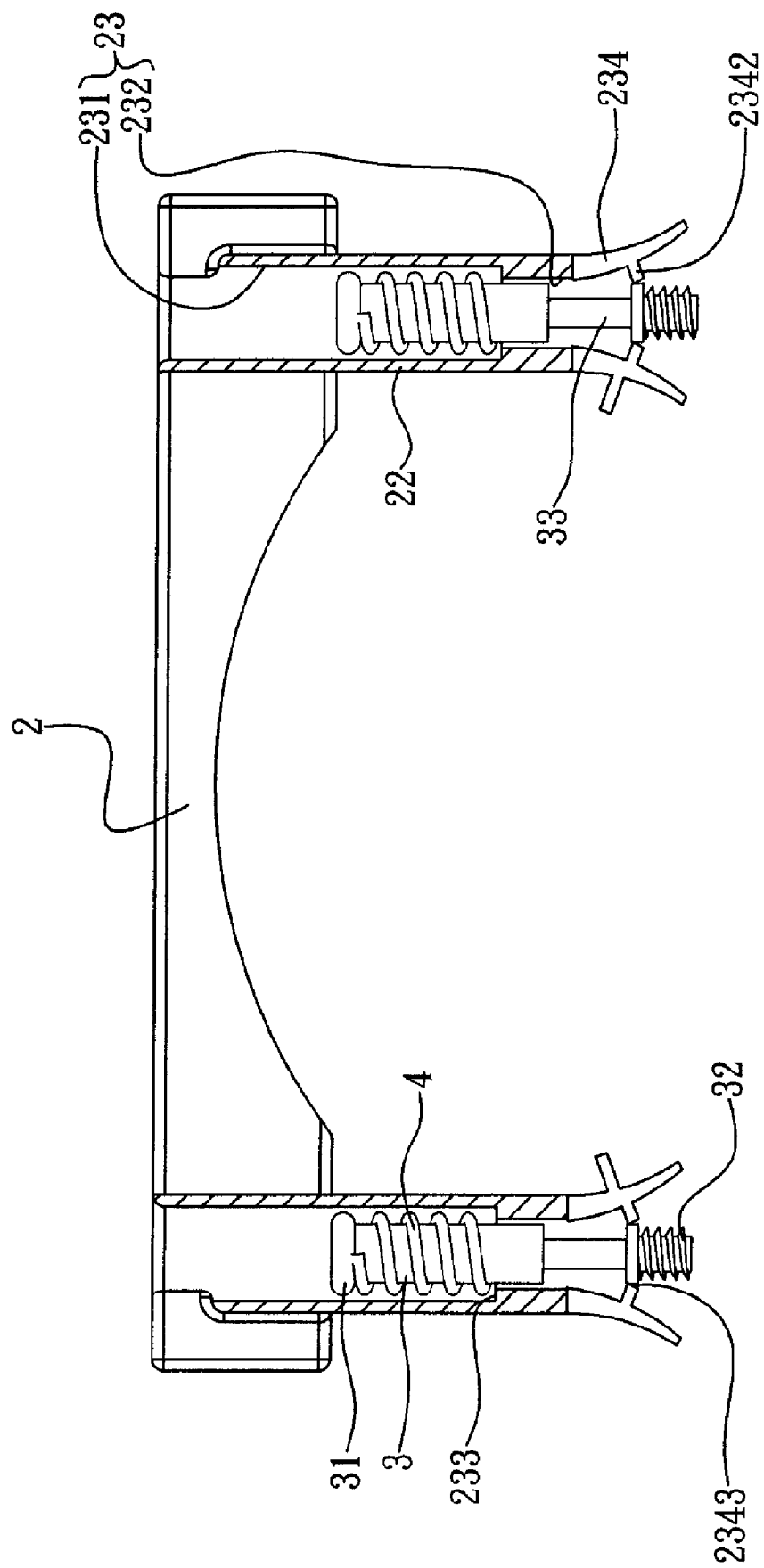
FIG. 7 is another assembled sectional view similar to FIG. 6 illustrating paw tabs being propped up.

Referring to FIG. 7, when the screw member 3 is inserted into the step hole 23, the engaging section 32 passes through the step hole 23 toward the paw tabs 234 at the free end of the respective leg post 22 and presses the conical guide part 2343 and pushes the projection 2342 such that the projection 2342 with the paw tabs 234 is elastically propped up radially and then the paw tabs 234 resiliently move back to the original positions thereof while the neck section 33 moves to be opposite to the projection 2342. Meanwhile, the projection 2342 catches the outer circumferential side of the neck section 33 as shown in FIG. 6 such that the elastic member 4 is disposed between the head part 31 and the step 233 to allow the paw tabs 234 and the projection 2342 holding the neck section 33 elastically and preventing the screw member 3 from escaping reversely, i.e., escaping toward a side of the fame 2.

Once the screw member 3 is detached from the respective leg post 22, a hand tool such as a spanner is employed to prop up the paw tabs 234 radially and release the projection 2342 such that the screw member 3 can be taken out of the respective leg post 22 successfully. It is appreciated that the engaging plate provided in the prior art is not needed in the structural screw device of the present invention. In this way, less material cost and assembling procedure can be obtained advantageously and no destructive action is needed in order to detach the screw member 3 from the respective leg post 22. That is, structural arrangement of the leg post 22 can be used repeatedly with a feature of economy and environmental protection.

Figure 8:
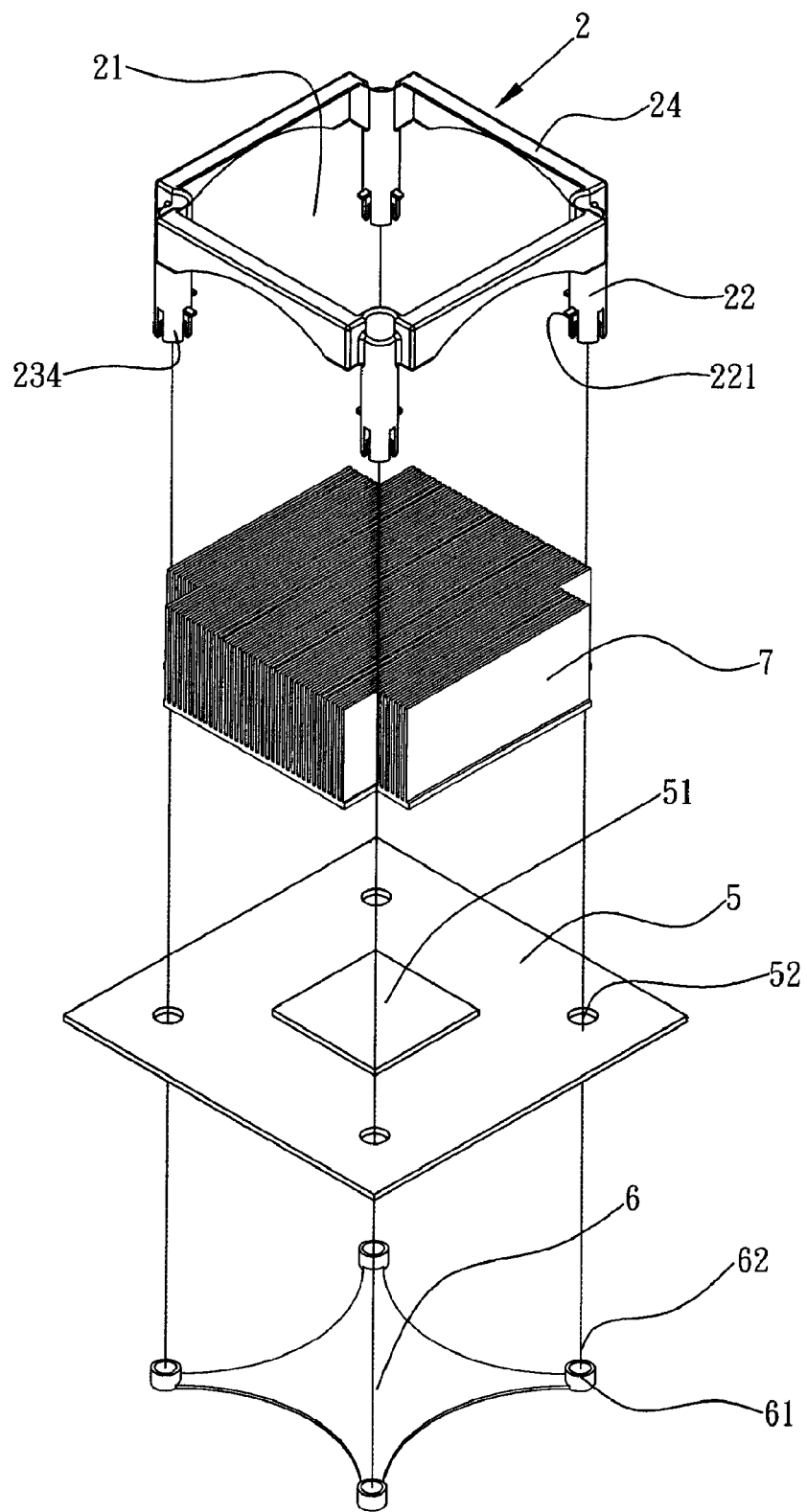
FIG. 8 is a disassembled perspective view illustrating the structural screw device in association with a radiator and a circuit board.
Figure 9:
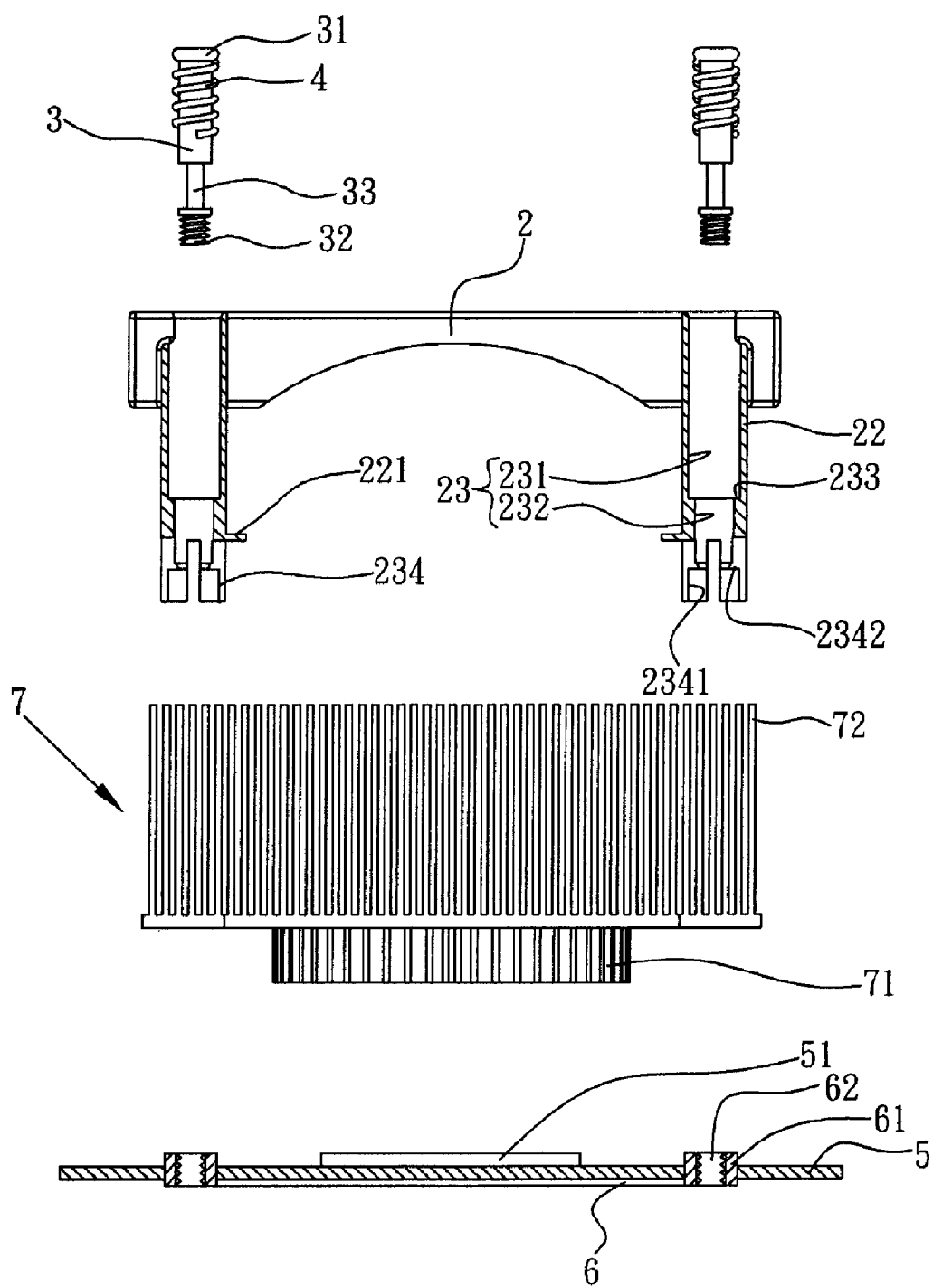
FIG. 9 is a disassembled sectional view illustrating the structural screw device in association with a radiator and a circuit board.
Figure 10:
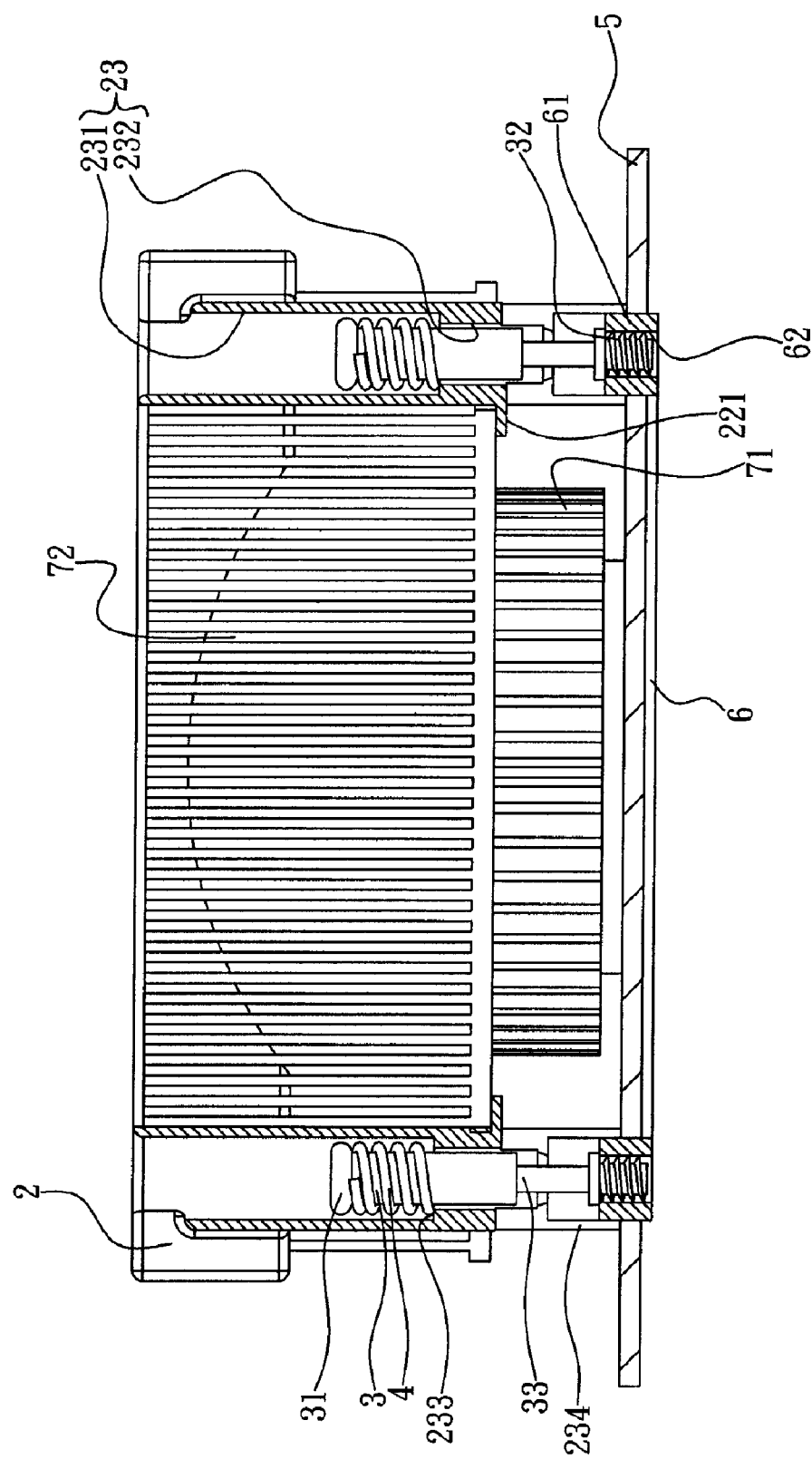
FIG. 10 is an assembled sectional view of FIG. 9.

Referring to FIGS. 8, 9 and 10, a back plate 6 is provided to join the structural screw device 2 recited in the preceding description to secure a radiator 7 to a heat generating component 51 such as CPU on a side of circuit board 5 for helping heat dissipation. The circuit board 5 provides through holes 52 to surround the generating component 51 for the frame 2 with the screw members 3 being capable of being set up a heat dissipation module with the radiator 7 and the back plate 6. The radiator 7 has a base 71 and a plurality of fins 72 are joined to the base 71 and the bottom of the base 71 contacts with the upper surface of the heat dissipating component 51.

The back plate 6 is disposed at another side of the circuit board 5 and provides cylindrical members 61 with threaded fitting holes 62 to penetrate and extend outward the through hole 52 of the circuit board 5.

The frame 2 covers the fins 72 above the base 71 and the upper plate 24 is joined to the top of the radiator 7 in a way of the leg posts 22 being disposed at four corners of the radiator 7 and the support piece 221 of the respective leg post 22 engaging with the radiator 7. Further, the leg posts 22 are corresponding to the cylindrical members 61 such that the third hole 2341 formed with the paw tabs 234 fits with the respective cylindrical member 61 for performing function of fast positioning.

Further, the screw members 3 in the leg posts 22 engage with the threaded fitting holes 62 and the elastic member 4 is biased with the head part 31 of the respective screw member 3 against the step 233. In this way, the engaging section 32 is prevented from excessive engagement to the threaded fitting hole 62 respectively and the radiator 7 can be secured to the circuit board 5. It is appreciated that the structural screw device according to the present invention provides advantage of positioning the radiator and the circuit board rapidly in advance for facilitating the subsequent assembling job and overcoming alignment problem resided in the prior art.

While the invention has been described with referencing to preferred embodiments thereof, it is to be understood that modifications or variations may be easily made without departing from the spirit of this invention, which is defined by the appended claims.

What is claimed is:

1. A structural screw device for a radiator assembly comprising:

a frame with four corners providing at least a leg post with an axial though hole; and a screw member being inserted into the leg post and providing a head section, a main body, a neck section and an engaging section and the main body being surround with an elastic member;

characterized in that the axial through hole of the leg post provides a first hole section and a second hole section with a step at intersection of the first and the second section; a free end of the leg post has a plurality of split paw portions and each of the paw portions has an inner projection such that the neck section is caught with the projection while the screw member is inserted into the through hole in a way of the engaging section extending to the paw portions and the elastic member being biased against the step.

2. The structural screw device for a radiator assembly as defined in claim 1, wherein the leg post is joined to the frame integrally.

3. The structural screw device for a radiator assembly as defined in claim 1, wherein the projection has a conical guide part.

4. The structural screw device for a radiator assembly as defined in claim 1, wherein the first hole provides a diameter greater that that of the second hole section.

5. The structural screw device for a radiator assembly as defined in claim 1, wherein the elastic member is a spring.

6. The structural screw device for a radiator assembly as defined in claim 1, wherein the engaging section provides screw threads.

7. The structural screw device for a radiator assembly as defined in claim 1, wherein the leg post provides a support piece at the outer side thereof next to the upper end of the respective paw section.

8. The structural screw device for a radiator assembly as defined in claim 1, wherein the axial length of the neck section is equal to the axial length of the engaging section.

9. The structural screw device for a radiator assembly as defined in claim 1, wherein the axial length of the neck section is greater than the axial length of the engaging section.

10. A heat dissipating module comprising:

a circuit board providing a heat dissipating component at a side thereof and a plurality of locating holes surrounding the heat dissipating component;

a radiator providing a base and a plurality of cooling fins, the cooling fins being joined to the base and the base contacting the heat generating component;

a back plate being disposed at another side of the circuit board opposite to the radiator, providing a plurality of cylindrical members for passing through the locating holes and each of the cylindrical members has a fitting hole;

a frame with four corners providing at least a leg post with an axial through hole; and a screw member being inserted into the leg post and providing a head section, a main body, a neck section and an engaging section and the main body being surround with an elastic member;

wherein the axial through hole of the leg post provides a first hole section and a second hole section with a step at intersection of the first and the second section; a free end of the leg post has a plurality of split paw portions and each of the paw portions has an inner projection such that the neck section is caught with the projection while the screw member is inserted into the through hole in a way of the engaging section extending to the paw portions to engage with the fitting hole and the elastic member being biased against the step.

11. The heat dissipating module as defined in claim 10, wherein the leg post is joined to the frame integrally.

12. The heat dissipating module as defined in claim 10, wherein the projection has a conical guide part.

13. The heat dissipating module as defined in claim 10, wherein the first hole has a diameter greater that that of the second hole section.

14. The heat dissipating module as defined in claim 10, wherein the elastic member is a spring.

15. The heat dissipating module as defined in claim 10, wherein the engaging section provides screw threads.

16. The heat dissipating module as defined in claim 10, wherein the leg post provides a support piece at the outer side thereof next to the upper end of the respective paw section.

17. The heat dissipating module as defined in claim 10, wherein the axial length of the neck section is equal to the axial length of the engaging section.

18. The heat dissipating module as defined in claim 10, wherein the axial length of the neck section is greater than the axial length of the engaging section.

* * * * *